United States Patent [19]
Thetford et al.

[11] Patent Number: 5,700,395
[45] Date of Patent: Dec. 23, 1997

[54] DISPERSANTS

[75] Inventors: Dean Thetford, Rochdale; John David Schofield, Bury, both of United Kingdom

[73] Assignee: Zeneca Limited, London, England

[21] Appl. No.: 525,725

[22] PCT Filed: Feb. 25, 1994

[86] PCT No.: PCT/GB94/00379

§ 371 Date: Sep. 25, 1995

§ 102(e) Date: Sep. 25, 1995

[87] PCT Pub. No.: WO94/21368

PCT Pub. Date: Sep. 29, 1994

[30] Foreign Application Priority Data

Mar. 25, 1993 [GB] United Kingdom ............... 9306222

[51] Int. Cl.$^6$ ................ B01J 13/00; B01F 17/16
[52] U.S. Cl. ............ 252/309; 252/357; 252/62.54; 106/504; 528/329.1; 71/64.08
[58] Field of Search ................ 252/357, 62.54, 252/309; 106/504; 528/329.1; 71/64.08

[56] References Cited

U.S. PATENT DOCUMENTS

| 3,778,387 | 12/1973 | Stansfield et al. | 106/504 |
| 4,645,611 | 2/1987 | Campbell et al. | 252/357 |
| 4,861,380 | 8/1989 | Campbell et al. | 106/504 |
| 5,395,743 | 3/1995 | Brick et al. | 430/496 |
| 5,418,101 | 5/1995 | Holmes et al. | 430/78 |

FOREIGN PATENT DOCUMENTS

| 158 406 | 10/1985 | European Pat. Off. . |
| 208 041 | 1/1987 | European Pat. Off. . |
| 233 684 | 8/1987 | European Pat. Off. . |
| 551 766 | 7/1993 | European Pat. Off. . |
| 2 001 083 | 1/1979 | United Kingdom . |

*Primary Examiner*—Richard D. Lovering
*Attorney, Agent, or Firm*—Cushman Darby & Cushman IP Group Pillsbury Madison & Sutro LLP

[57] ABSTRACT

A dispersant comprising a polyethyleneimine residue carrying polyester chains derived from a caprolactone and at least one other specified lactone or hydroxycarboxylic acid.

10 Claims, No Drawings

DISPERSANTS

This application claims benefit of international application PCT/GB94/00379 filed Feb. 25, 1994.

This invention relates to dispersants and to dispersions of solids in organic liquids containing such dispersants.

Dispersants of a polymeric nature in which polyester chains are attached to a polyethyleneimine chain are already known in the art. Thus, our GB-A-2001083 describes dispersants which are reaction products of polyethyleneimine and a polyester having a free carboxylic acid group, the preferred polyesters being derived from hydroxycarboxylic acids having between 8 and 14 carbon atoms between the carboxylic acid and hydroxy groups, for example ricinoleic acid and 12-hydroxystearic acid. In EP-A-0158406 and EP-A-0208041, dispersants are described in which a polyethyleneimine carries poly(carbonylalkyleneoxy) chains in which the alkylene group can contain up to 8 carbon atoms, the preferred chain being a poly(6-hydroxyhexanoate) chain derivable from ε-caprolactone.

The above mentioned publications describe the use of the dispersants for the production of dispersions of finely divided solids of various types, for example pigments, dyes, magnetic metal oxides, fillers and the like, in organic solvents which may be of low polarity such as hydrocarbons or of higher polarity such as ketones and carboxylic acid esters. Whilst the described dispersants are highly effective for dispersing many pigments in solvents such as ketones and esters, their solubility in these solvents, especially the esters, and particularly at temperatures below the normal ambient temperature, is somewhat limited. The dispersants have a tendency to crystallise out of the ester solvent at temperatures below the normal ambient temperature and this leads to the pigment seeding out of the paint. Dispersions of some pigments may also have undesirable viscosity characteristics using the aforementioned dispersants.

It has now been found that certain dispersants, as hereinafter defined, possess improved solubility characteristics in a wide range of solvents, especially ketone and ester solvents and particularly at temperatures below the normal ambient temperature. Furthermore, dispersions of solids such as organic pigments in several types of solvent have lower viscosities than corresponding prior art dispersions, thus permitting the production of dispersions having higher pigment loadings.

Accordingly, the present invention provides a dispersant comprising a polyethyleneimine residue carrying a plurality of poly(carbonylalkyleneoxy) chains each containing a plurality of repeat units derivable from 6-hydroxyhexanoic acid and at least one other hydroxycarboxylic acid selected from ricinoleic acid, 12-hydroxystearic acid, 12-hydroxydodecanoic acid, 5-hydroxydodecanoic acid, 5-hydroxydecanoic acid and 4-hydroxydecanoic acid, the weight ratio of units derivable from 6-hydroxyhexanoic acid to units derivable from the other hydroxycarboxylic acid or acids being in the range from 90:10 to 10:90, or a salt thereof with an acid.

Preferably, the weight ratio of units derivable from 6-hydroxyhexanoic acid to units derivable from the other hydroxycarboxylic acid or acids is in the range from 20:80 to 80:20, especially from 20:80 to 50:50.

The polyethyleneimine (hereinafter referred to as "PEI") residue present in the dispersants of the invention may be branched or straight-chained and typically has a weight average molecular weight of at least 500, preferably at least 1,000, and especially at least 10,000. The average molecular weight is preferably less than 600,000, more preferably less than 200,000 and especially less than 50,000.

The poly(carbonylalkyleneoxy) chains (hereinafter referred to as "PCAO chains") present in the dispersants of the invention are polyester chains derivable by the polymerisation of the aforementioned hydroxycarboxylic acids (or the corresponding lactones where appropriate) said chains being copolyester chains containing, in block or random arrangement, a plurality of carbonylalkyleneoxy (hereinafter referred to as "CAO") repeat units derivable from 6-hydroxyhexanoic acid and at least one of the aforementioned other hydroxycarboxylic acids. The PCAO chains typically contain, on average, from 2 to 100 preferably from 3 to 40 and more preferably from 4 to 15 of said CAO groups and may carry a chain-stopping terminal group at the oxy end such as optionally substituted alkyl carbonyl, especially an alkyl carbonyl group containing 12 or more carbon atoms.

The PCAO chains may be attached to the PEI residues by means of covalent amide and/or ionic salt linkages formed between the PEI residue and a hydroxycarboxylic acid of the PCAO chain. The acid is hereinafter referred to as PCAO acid. Such amide linkages may be formed by reaction of the terminal carboxylate group of the PCAO acid and a primary or secondary amino group in the PEI whilst salt linkages are formed between the terminal carboxylate group of the PCAO acid and a positively charged nitrogen atom of a substituted ammonium group in the PEI.

The weight ratio of PCAO chains to PEI residue is typically in the range from 2:1 to 30:1, preferably from 3:1 to 20:1, more preferably from 8:1 to 20:1 and especially from 10:1 to 15:1.

The dispersants of the invention may be in the form of a polyamine in which nitrogen atoms in the PEI residue which are not linked to a PCAO chain exist as free amino groups or in the form of a salt in which said nitrogen atoms exist as substituted ammonium groups associated with counterions derivable from organic and/or inorganic acids or an intermediate form containing free amino groups and substituted ammonium groups.

Dispersants of the invention may be prepared by reacting a PEI with a PCAO acid or acids or precursors thereof, the constitution and proportions of said reactants being such as to provide products in which the weight ratio of repeat units derivable from 6-hydroxyhexanoic acid to repeat units derivable from the other hydroxycarboxylic acid or acids is from 10:90 to 90:10, preferably from 20:80 to 80:20 and especially from 20:80 to 50:50.

The PCAO acid used in the preparation of the dispersant is a copolyester obtained by the random or block copolymerisation, in appropriate proportions, of caprolactone (or 6-hydroxyhexanoic acid) with at least one of 12-hydroxystearic acid, ricinoleic acid, 12-hydroxydodecanoic acid, delta-dodecanolactone (or 5-hydroxydodecanoic acid), delta-dodecanolactone (or 5-hydroxydecanoic acid) and gamma-decanolactone (or 4-hydroxydecanoic acid) optionally in conjunction with a carboxylic acid which is free from hydroxyl groups, especially an alkane or alkene carboxylic acid containing up to 20 carbon atoms which may optionally carry substituents, such as alkoxy, which are inert under the reaction conditions described herein, such as acetic acid, caproic acid, lauric acid, stearic acid, palmitic acid, oleic acid, litoleic acid, linolenic acid and methoxyacetic acid. Polyesterification is conveniently performed at a temperature of from 100° to 250° C., preferably from 130° to 200° C., in the presence of an esterification catalyst, for example titanium (IV) butylate, zirconium naphthenate, zinc acetate or toluenesulphonic acid.

PCAO acid precursors which may be reacted with the PEI are the lactones and hydroxycarboxylic acids mentioned above in connection with the preparation of the PCAO acids. It is particularly convenient, when preparing dispersants or PCAO acids based in part on 12-hydroxystearic acid, to use the commercially available hydrogenated castor oil fatty acid which contains minor amounts of stearic and palmitic acids in addition to 12-hydroxystearic acid. It is similarly convenient to use ricinoleic acid containing minor amounts of oleic acid.

The PCOA which is reacted with the PEI preferably has an acid value of at least 10, more preferably at least 20 and especially at least 30 mg KOH/g. The acid value is preferably less than 100, more preferably less than 80 and especially less than 60 mg KOH/gm.

Reaction between the PEI and the PCAO acid or precursors thereof may be effected at temperatures of from 25° to 250° C. for up to 24 hours. Under mild conditions (low temperature and/or short reaction time), salt linkages are formed between the PEI and the PCAO acid whilst under more severe conditions (higher temperature and/or longer reaction time), amide linkages or a mixture of amide and salt linkages are formed.

Dispersants in the salt form may be obtained by reacting the polyamine form with an acid or a quaternising agent. Suitable acids and agents are mineral acids, strong organic acids and acidic salts, such as acetic acid, sulphuric acid, hydrochloric acid, alkylsulphonic acids, alkyl hydrogen sulphates and arylsulphonic acids, especially acid forms of dyes and pigments, and quaternising agents such as dimethyl sulphate, diethyl sulphate and ethyl halides.

We have obtained particularly useful dispersing agents where polyethyleneimine (MW 20,000) is reacted with 6-hydroxyhexanoic acid and ricinoleic acid optionally in the presence of lauric acid and where polyethyleneimine (MW 20,000) is reacted with 6-hydroxyhexanoic acid and 12-hydroxy stearic acid optionally in the presence of lauric acid or stearic acid.

According to a further feature of the invention, there is provided a dispersion of a solid in an organic medium containing a dispersant as hereinbefore defined.

The solid present in the dispersions of the invention may be any inorganic or organic solid material which is substantially insoluble in the organic medium at the temperature concerned and which it is desired to stabilise in a finely divided form therein.

Examples of suitable solids are pigments for solvent inks; pigments, extenders and fillers for paints and plastics materials; dyes,especially disperse dyes; optical brightening agents and textile auxiliaries for solvent dyebaths, inks and other solvent applications systems; solids for oil-based and invert-emulsion drilling muds; dirt and solid particles in dry cleaning fluids; particulate ceramic materials; magnetic materials for magnetic recording media, and biocides, agrochemicals and pharmaceuticals which are applied as dispersions in organic media.

A preferred solid is a pigment from any of the recognised classes of pigments described, for example, in the Third Edition of the Colour Index (1971) and subsequent revisions of, and supplements thereto, under the chapter headed "Pigments". Examples of inorganic pigments are titanium dioxide, zinc oxide, Prussian blue, cadmium sulphide, iron oxides, vermilion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, quinacridones and carbon blacks.

Other preferred solids are: extenders and fillers such as talc, kaolin, silica, barytes and chalk; particulate ceramic materials such as alumina, silica, zirconia, titania, silicon nitride, boron hi.ride, silicon carbide, boron carbide, mixed silicon-aluminium nitrides and metal titanates; particulate magnetic materials such as the magnetic oxides of transition metals, especially iron and chromium, e.g. gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; and agrochemicals such as the fungicides flutriafen, carbendazim, chlorothalonil and mancozeb.

The organic medium present in the dispersions of the invention is preferably a polar organic medium or a substantially non-polar aromatic hydrocarbon or halogenated hydrocarbon. By the term "polar" in relation to the organic medium is meant an organic liquid or resin capable of forming moderate to strong bonds as described in the article entitled "A Three Dimensional Approach to Solubility" by Crowley et al in Journal of Paint Technology, Vol 38, 1966, at page 269. Such organic media generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39 to 40 and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate and ethyl butyrate, glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate, alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either lone or in admixture with the aforementioned polar solvents, are aromatic hydrocarbons, such as toluene and xylene, and halogenated aliphatic and aromatic hydrocarbons, such as trichloro-ethylene, perchloroethylene and chlorobenzene.

Examples of suitable polar resins, as the medium for the dispersion form of the present invention, are film-forming resins such as are suitable for the preparation of inks, paints and chips for use in various applications such as paints and inks. Examples of such resins include polyamides, such as Versamid (Trade Mark) and Wolfamid (Trade Mark), and cellulose ethers, such as ethyl cellulose and ethyl hydroxyethyl cellulose. Examples of paint resins include short oil alkyd/melamine-formaldehyde, polyester/melamine-formaldehyde, thermosetting acrylic/melamine-formaldehyde, long oil alkyd and multi-media resins such as acrylic and urea/aldehyde.

If desired, the dispersions may contain other ingredients, for example resins (where these do not already constitute the organic medium), binders, fluidising agents (such as those described in GB-A-1508576 and GB-A-2108143), anti-sedimentation agents, plasticisers, levelling agents and preservatives.

The dispersions typically contain from 5 to 95% by weight of the solid, the precise quantity depending on the nature of the solid and the quantity depending on the nature of the solid and the relative densities of the solid and the organic medium. For example, a dispersion in which the solid is an organic material, such as an organic pigment, preferably contains from 15 to 60% by weight of the solid whereas a dispersion in which the solid is an inorganic material, such as an inorganic pigment, filler or extender, preferably contains from 40 to 90% by weight of the solid based on the total weight of dispersion.

The dispersion may be obtained by any of the conventional methods known for preparing dispersions. Thus, the solid, the organic medium and the dispersant may be mixed in any order, the mixture then being subjected to a mechanical treatment to reduce the particles of the solid to an appropriate size, for example by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the dispersion.

Dispersions containing the dispersants of the invention are particularly suitable for use in paints, especially high solids paints, inks, especially flexographic, gravure and screen inks, and non-aqueous ceramic processes, especially tape-coating, doctor-blade, extrusion and injection moulding type processes.

The invention is illustrated but not limited by the following Examples in which all parts and percentages are by weight unless otherwise indicated.

EXAMPLE 1

Caprolactone (50 g 0.44 mol) was stirred with lauric acid (17.55 g) and titanium (IV) butylate (0.28 g 0.0008 mol) was added to the solution. The mixture was stirred at 170° C. for 6 hours under a nitrogen atmosphere. Ricinoleic acid (130.75 g 0.44 mol) was added to the mixture which was stirred at 170° C. for a further 16 hours after which the acid value of the mixture was 58.2 mg KOH/g. Polyethyleneimine (MW.20,000) (15.28 g) was added to the mixture which was stirred at 120° C. for 6 hours under a nitrogen atmosphere to give Dispersant 1, a brown liquid (202.4 g).

EXAMPLE 2

Lauric acid (17.58 g 0.88 mol) and caprolactone (50.0 g 0.44 mol were stirred in the presence of titanium (IV) butylate catalyst (0.14 g) at 170° C. for 6 hours under a nitrogen atmosphere. Ricinoleic acid (78.45 g 0.26 mol) and titanium (IV) butylate (0.14 g) were added to the mixture which was stirred at 170° C. for 16 hours under a nitrogen atmosphere to give a brown liquid having an acid value of 51.1 mg KOH/g. Polyethyleneimine of MW 20,000 (11.25 g) was added to the liquid which was stirred at 120° C. for 6 hours under a nitrogen atmosphere. The product, hereinafter referred to as Dispersant 2, was isolated as a brown liquid.

EXAMPLE 3

The procedure described in Example 2 was repeated except that the ricinoleic acid was replaced by 12-hydroxystearic acid (78.98 g 0.26 mol). The product, hereinafter referred to as Dispersant 3, was isolated as a brown liquid.

EXAMPLE 4

Stearic acid (33.8 g), 12-hydroxystearic acid (67.5 g) and caprolactone (43.90 g) were stirred in the presence of titanium (IV) butylate catalyst (0.28 g) at 170° C. for 6 hours under a nitrogen atmosphere. Polyethyleneimine of MW 20,000 (11.10 g) was added to the mixture which was stirred at 120° C. for 6 hours under a nitrogen atmosphere to give Dispersant 4 as a brown gum.

EXAMPLE 5

The procedure described in Example 4 was repeated except that the quantities of stearic acid (26.5 g), 12-hydroxystearic acid (52.9 g), caprolactone (82.0 g 0.72 mol) and polyethyleneimine MW 20,000 (12.50 g) were altered. The product, hereinafter referred to as Dispersant 5, was obtained as a brown gummy solid.

EXAMPLES 6–11

The procedure described in Example 3 was repeated using the following amounts (in grams) of reactants.

| Example | Lauric Acid | Caprolactone | 12-Hydroxystearic Acid | PE MW 20,000 |
|---|---|---|---|---|
| 6 | 17.58 | 20.22 | 105.48 | 11.02 |
| 7 | 17.58 | 80.00 | 52.74 | 11.56 |
| 8 | 17.58 | 50.00 | 131.85 | 15.35 |
| 9 | 17.58 | 50.00 | 263.70 | 25.49 |
| 10 | 17.58 | 50.00 | 78.98 | 29.31 |
| 11 | 17.58 | 50.00 | 78.98 | 5.86 |

The products of Examples 6–11 are hereinafter referred to as Dispersants 6–11 respectively.

EXAMPLE 12

Caprolactone (60 g 0.526 mol), ricinoleic acid (156.90 g 0.526 mol) and titanium (IV) butylate (0.43 g 0.001 mol) were stirred at 170° C. under a nitrogen atmosphere for 6 hours until the acid value of the reaction mixture reached 50.5 mg KOH/g. Polyethyleneimine (M.W.20,000) (16.68 g) was added to the reaction mixture which was stirred at 120° C. for 6 hours under a nitrogen atmosphere to give Dispersant 12 as a brown liquid (210.0 g).

EXAMPLE 13

Dispersant 2 (40.0 g) was stirred under a nitrogen atmosphere at 120° C. and methanesulphonic acid (1.7 ml) was added dropwise over 10 minutes. The mixture was stirred at 120° C. for 16 hours until no decolourisation of bromocresol green indicator showed that all the methane sulphonic acid had reacted. The product, Dispersant 13, was obtained as a brown liquid (35.0 g).

EXAMPLE 14

The experimental procedure for example 13 was repeated except that Dispersant 1 (40.0 g) was used in place of Dispersant 2 and the amount of methanesulphonic acid used was increased to 1.9 ml. The product, Dispersant 14, was obtained as a brown liquid (38.1 g).

EXAMPLE 15

The dispersants prepared in the preceding Examples were evaluated in dispersions of various pigments in various organic solvents. The dispersions were prepared as follows: The dispersant (0.45 g) was weighed into an 8 dram trident vial and the solvent (6.05 g) was added. If the agent did not dissolve quickly (after 1 hour), the solution was warmed to 50° C. (steam chest) until the agent had completely dissolved. Approximately 17 g of 3 mm glass beads were added to the vial along with a disc of plastic sheet to the vial cap prevent cardboard in the cap being pulverised). The pigment (3.5 g) was then added to the vial which was sealed with tape. The vial was shaken for 16 hours on a horizontal shaker.

The agent's performance was evaluated by assessment of millbase fluidity and any change in fluidity on standing. The following classifications denote the millbase fluidity found for the dispersions.

A—Very Fluid

B—Fluid, gels after 10 minutes

C—Fluid, gels after 60 seconds

D—Slightly fluid, gels immediately after shaking by hand

E—Thick, immovable gel.

Table 1 below gives the results obtained with dispersions of Novoperm Red F3RK70. The control dispersant referred to in Table 1 is a product of a type disclosed in EP-A-0158406 and EP-A-0208041 obtained by heating 1 mole of lauric acid with 12 moles of caprolactone in the presence of 0.1% by weight of titanium (IV) butylate at 170° C. for 6 hours and then reacting the resulting polymer (13 parts by weight) with 1 part by weight of polyethyleneimine (MW 20,000) at 120° C. for 6 hours.

stirring over 2 hours at 170° C. under a nitrogen atomosphere. The reaction mixture was stirred at 170° C. under a nitrogen atmosphere for a further 4 hours or until the acid value of the mixture reached 50 mg KOH/g (±2 mg).

Polyethyleneimine (PEI) (M.W. 20,000) (8.36 g) was added to the reaction mixture at 120° C. and the whole mixture was stirred at 120° C. for 6 hours under a nitrogen atmosphere to give Dispersant 19 as a brown liquid (100 g).

EXAMPLE 20

The experimental procedure described in Example 19 was repeated except that the quantity of PEI used was adjusted (12.4 g).

Acid value of intermediate=52 mg KCH/g.

Dispersant 20 was obtained as a brown liquid (120 g).

EXAMPLE 21

The experimental procedure described in Example 19 was again repeated except that the reaction mixture was heated at 170° C. for 6 hours under a nitrogen atmosphere to give an intermediate with an acid value of 36 mg KOH/g. The intermediate was then stirred with PEI at 120° C. for 6 hours under nitrogen.

Dispersant 21 was obtained as a brown liquid (120 g).

EXAMPLE 22

Dispersions of Novoperm Red F3RK70 were prepared using Dispersants 16–18, 20 and 21 as described in Example

TABLE 1

| SOLVENT | DISPERSANT | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | Control |
| Methyl ethyl ketone | C | B | B | B | B | D | D | D | D | B | E | A | C | C | E |
| Xylene | A | A | A | A | A | A | B | A | A | A | B | A | A | A | B |
| n-Butyl acetate | B | A | A | A | A | B | B | A | B | A | B | A | B | B | B |
| 3-Methoxypropyl acetate | B | B | A | B | B | D | B | D | D | B | C | B | B | B | C |

EXAMPLE 16

Lauric acid (14.71 g; 73 mmols), caprolactone (26.82 g; 235 mmols) and γ-decanolactone (40 g; 235 mmols) were stirred at 170° C. and titanium IV butylate (0.2 g; 0.6 mmols) was added and the whole mixture was stirred at 170° C. for 8 hours under a nitrogen atomosphere. Polyethyleneimine (MW 20,000; 6.29 g) was added to the mixture which was stirred at 120° C. for 6 hours under a nitrogen atmosphere to give Dispersant 16 as a brown liquid (82.3 g).

EXAMPLE 17

The procedure described in Example 16 was repeated except that γ-decanolactone was replaced by an equivalent quantity of δ-decanolactone (40 g; 235 mmols). Dispersant 17 was obtained as a brown syrup (80.4 g) was obtained.

EXAMPLE 18

The procedure described in Example 16 was repeated except that γ-decanolactone was replaced by an equivalent quantity of δ-dodecanolactone (46.59 g; 235 mmols) and the quantity of polyethyleneimine (6.79 g) used, was altered. Dispersant 18 was obtained as a brown, viscous syrup (86.9 g) was obtained.

EXAMPLE 19

Caprolactone (30 g; 0.26 mol) was added dropwise to ricinoleic acid (78.45 g; 0.26 mol) in the presence of titanium IV butylate catalyst (0.22 g; 0.0006 mol) with 15. The results are given in Table 2 below.

TABLE 2

| SOLVENT | DISPERSANT | | | | | |
|---|---|---|---|---|---|---|
| | 16 | 17 | 18 | 20 | 21 | Control |
| methylethylketone | B | D | D | A | B | E |
| xylene | A | A | A | A | A | B |
| n-butylacetate | B | B | C | A | A | B |
| 3-methoxypropylacetate | C | D | D | B | A | C |

Footnote to Table 2
A–E are as described in Example 15.

EXAMPLE 23

Preparation of Intermediate I 12-hydroxystearic acid (260 g 865 mmols; ex Banner) and ε-caprolactone (130 g 1139 mmols; ex Interox) were stirred together at 170° C. Titanium IV butylate (1.0 g 3 mmols; ex Aldrich) was added and the reaction mass was stirred for a further 7 hours at 170° C. until the acid value of the reaction mass was about 50 mg KOH/g. The product consists essentially of a 2:1 condensate of 12-hydroxystearic acid with caprolactone and was obtained as a brown viscous liquid (380 g).

EXAMPLE 24

Intermediate I the preparation of which is described in Example 23 (52 g) and polyethyleneimine 6 (4.0 g; MW 600; ex Dow Chemical) were stirred at 120° C. for 6 hours under a nitrogen atmosphere. Dispersant 24 was obtained as a pale brown oil (51 g).

EXAMPLE 25

Example 24 was repeated except that the PEI used in that example was replaced with polyethyleneimine 12 (4.0 g; MW 1200; ex Dow Chemical). Dispersant 25 was obtained as a pale orange liquid (52 g).

EXAMPLE 26

Example 24 was again repeated except using as PEI polyethyleneimine 18 (4.0 g; MW 1800; ex Dow Chemical). Dispersant 26 was obtained as a pale orange liquid (51 g).

EXAMPLE 27

Methoxyacetic acid (5.0 g; 55.5 mmols; ex Fluka and ε-caprolactone (50.67 g; 444 mmols; ex Interox) were stirred in the presence of titanium IV butylate (0.35 g; 1.03 mmols; ex Aldrich) at 180° C. for 6 hours under a nitrogen atmosphere.

Ricinoleic acid (33.78 g; 113 mmols, ex Fluka) together with titanium IV butylate (0.4 gm; 1.17 mmols) was added to the reaction mass above and stirred at 180° C. for a further 5 hours under a nitrogen atmosphere until the acid value reached about 50 mg KOH/g.

Polyethyleneimine 12 (5 g; MW 1200; ex Nippon Shokhubai) was added at 120° C. and the reaction mass stirred at 120° C. for 6 hours under nitrogen. Dispersant 27 was obtained as a brown solid (90.2 g).

EXAMPLE 28

Litoleic acid (20 g; 71.3 mmols; ex BDH) and ε-caprolactone (81.37 g; 713 mmols; ex Interox) were stirred at 180° C. for 6 hours under a nitrogen atmosphere in the presence of titanium IV butylate (0.35 g).

Ricinoleic acid (34.87 g; 117 mmols; ex Fluka) and titanium IV butylate (0.4 g) was then added to the above reaction mass and stirring continued at 180° C. for 5 hours under nitrogen until the acid value reached 50 mg KOH/g.

The reaction mass was then cooled to 120° C., and polyethyleneimine 12 (15.22 g; MW 1200; ex DOW Chemical) was added and the reaction mass stirred at 120° C. for 6 hours under nitrogen. Dispersant 28 was obtained as an orange viscous gum (148.4 g).

EXAMPLE 29

Linolenic acid (10 g; 35.9 mmols; ex Eastman) and ε-caprolactone (40.98 g; 359 mmols; ex Interox) were stirred in the presence of titanium IV butylate (0.35 g) at 180° C. for 6 hours under nitrogen.

Ricinoleic acid (27.32 g; 91.5 mmols; ex Fluka) and titanium IV butylate (0.4 g) were added and stirring continued at 180° C. for 5 hours under nitrogen until an acid value of 50 mg KOH/g was reached.

The reaction mass was then cooled to 120° C. and polyethyleneimine 12 (8.7 g; MW 1200; ex Dow Chemical) was added and stirring continued at 120° C. for a further 6 hours under nitrogen. Dispersant 29 was obtained as an orange viscous oil (84.3 g).

EXAMPLE 30

A 50% aqueous solution of polyethyleneimine P (20 g; ex BASF) was heated under reduced pressure to 100° C. in order to remove the water to give a clear viscous liquid (10.2 g). Intermediate I (90 g, ex Example 23) was added and the reaction mass stirred at 120° C. for 6 hours under nitrogen. Dispersant 30 was obtained as an orange viscous gum (95 g).

EXAMPLE 31

Dispersant 28 (40 gm, ex Example 28) was stirred at 120° C. and dimethylsulphate (3.68 gm, 29 mmols; ex Aldrich) was added dropwise. The reaction mass was then stirred at 120° C. for 4 hours under nitrogen until no unreacted dimethylsulphate was detected by testing an aliquot with bromocresol green in isopropanol solution. Dispersant 31 was obtained as an orange, viscous gum (36.7 g).

EXAMPLE 32

Example 31 was repeated except that the dimethylsulphate was replaced with p-toluenesulphonic acid (5.56 g, 29 mmols; ex Aldrich). Dispersant 32 was obtained as a viscous gum (40.3 g).

EXAMPLE 33

Dispersions of Novoperm Red F3RK70 were prepared from Disperants 23 to 32 as described in Example 15. The results are given in Table 3.

TABLE 3

| SOLVENT | DISPERSANT | | | | | | | | | |
|---|---|---|---|---|---|---|---|---|---|---|
| | 24 | 25 | 26 | 27 | 28 | 29 | 30 | 31 | 32 | Control |
| methylethylketone | C | B | B | B | B | B | B | C | C | E |
| xylene | A | A | A | A | A | A | A | B | B | B |
| n-butylacetate | A | A | A | A | A | A | A | A | A | B |
| 3-methoxy-propylacetate | B | A | A | A | A | A | A | A | A | C |

FOOTNOTE TO TABLE 3
A–E are as described in Example 15.

EXAMPLE 34

Titanium dioxide pigment (6.59 Tioxide TR92) mas milled with 0.1 g Dispersant dissolved in 3.49 solvent on a horizontal shaker as described in Example 15. The fluidity of the resultant dispersions was determined by hand-shaking of the vials. The results are given in Table 4 below.

TABLE 4

| SOLVENT | DISPERSANT | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| MEK | B | B | B | B | B | B | B | C | B | B | B | B | B | B |
| X | B | B | A | A | B | A | A | B | B | B | A | C | B | B |

TABLE 4-continued

| BA | B | B | B | B | B | B | B | B | B | B | A | B | B | B |
|----|---|---|---|---|---|---|---|---|---|---|---|---|---|---|
| MPA | C | C | C | C | B | B | C | C | C | C | C | B | C | C |

| | DISPERSANT | | | | | | | | | | | | | |
|---|---|---|---|---|---|---|---|---|---|---|---|---|---|---|
| SOLVENT | 16 | 17 | 18 | 20 | 21 | 24 | 25 | 26 | 27 | 28 | 29 | 30 | 31 | 32 | CONTROL |
| MEK | B | B | B | B | B | A | B | B | B | B | B | C | B | B | D |
| X | C | B | C | C | B | B | B | B | C | B | C | B | C | C | C |
| BA | B | B | B | B | B | A | A | A | B | B | B | B | B | B | E |
| MPA | C | B | B | C | C | B | B | B | B | B | C | B | C | D |

Footnote to Table 4
A-E are as described in Example 15
MEK = methylethylketone
X = Xylene
BA = n-butylacetate
MPA = 3-methoxypropylacetate

EXAMPLE 35

The solubility stability of the dispersants identified in Table 5 below was determined by dissolving 2 g dispersant in 3-methoxypropylacetate (10 ml) in an 8 dram vial. The solution was then stored in a 'fridge at 4° C. for 4 days and examined for separation and crystalisation. Some phase separation is considered not particularly problematic since the dispersant can be reconstituted by shaking but the evidence of crystals will inhibit the dispersant from functioning. The results are given in Table 5 below.

TABLE 5

| | APPEARANCE AFTER | |
|---|---|---|
| DISPERSANT | 1 DAY | 4 DAYS |
| 1 | S | S |
| 2 | S | S |
| 3 | S | S |
| 4 | S | P |
| 5 | S | P |
| 6 | S | S |
| 7 | S | S |
| 8 | S | S |
| 9 | S | P |
| 10 | S | S |
| 11 | S | S |
| 12 | S | S |
| 13 | S | S |
| 14 | S | S |
| 16 | S | S |
| 17 | S | S |
| 18 | S | S |
| 20 | S | S |
| 21 | S | S |
| 24 | S | S |
| 25 | S | S |
| 26 | S | S |
| 27 | S | S |
| 28 | S | S |
| 29 | S | S |
| 30 | S | S |
| 31 | S | S |
| 32 | S | S |
| Control | CR | CR |

Footnote to Table 5
S = solution
CR = crystals
P = phase separation
Control is that referred to in Example 15.

EXAMPLE 36

Example 35 was repeated using n-butylacetate as solvent. The results are given in Table 6 below.

TABLE 6

| | APPEARANCE AFTER | |
|---|---|---|
| DISPERSANT | 1 DAY | 4 DAYS |
| 1 | S | S |
| 2 | S | S |
| 3 | S | S |
| 4 | S | S |
| 5 | S | SG |
| 6 | S | S |
| 7 | S | S |
| 8 | S | S |
| 9 | S | S |
| 10 | S | S |
| 11 | S | S |
| 12 | S | S |
| 13 | S | S |
| 14 | S | S |
| 16 | S | S |
| 17 | S | S |
| 18 | S | S |
| 20 | S | S |
| 21 | S | S |
| 24 | S | S |
| 25 | S | S |
| 26 | S | S |
| 27 | S | S |
| 28 | S | S |
| 29 | S | S |
| 30 | S | S |
| 31 | S | S |
| 32 | S | S |
| Control | CR | CR |

Footnote to Table 6
S, CR, P & Control are as in the footnote to Table 5.
SG = slight gum.

We claim:

1. A dispersant comprising a polyethyleneimine residue carrying a plurality of poly(carbonylalkyleneoxy) chains each chain containing a plurality of repeat units derivable from 6-hydroxyhexanoic acid and at least one other hydroxycarboxylic acid selected from the group consisting of ricinoleic acid, 12-hydroxystearic acid, 12-hydroxydodecanoic acid, 5-hydroxydodecanoic acid, 5-hydroxydecanoic acid and 4-hydroxydecanoic acid; the weight ratio of units derivable from 6-hydroxyhexanoic acid to units derivable from the other hydroxycarboxylic acid or acids being in the range from 90:10 to 10:90, or a salt of said polyethyleneimine residue with an acid.

2. A dispersant as claimed in claim 1 wherein the polyethyleneimine has an average molecular weight of from 10,000 to 50,000.

3. A dispersant as claimed in either claim 1 or claim 2 wherein the poly(carbonylalkyleneoxy) chains contain from 4 to 15 carbonylalkyleneoxy groups.

4. A dispersant as claimed in claim 1 wherein the weight ratio of poly(carboxyalkyleneoxy) chains to polyethyleneimine is from 10:1 to 15:1.

5. A dispersant as claimed in claim 1 wherein the salt is a quaternary ammonium salt.

6. A dispersant as claimed claim 1 derived from 6-hydroxyhexanoic acid, ricinoleic acid and polyethyleneimine having a MW of from 10,000 to 50,000.

7. A dispersant as claimed in claim 1 derived from 6-hydroxyhexanoic acid, 12-hydroxystearic acid and polyethyleneimine having a MW of from 10,000 to 50,000.

8. A dispersion of a solid in an organic medium containing a dispersant as claimed in claim 1.

9. A dispersion as claimed in claim 8 wherein the solid is a pigment, a filler, a magnetic material or an agrochemical.

10. A dispersion as claimed in either claim 8 or claim 9 wherein the organic medium is a polar organic liquid.

* * * * *